United States Patent
El-Moussa et al.

(10) Patent No.: US 10,897,359 B2
(45) Date of Patent: Jan. 19, 2021

(54) CONTROLLED STORAGE DEVICE ACCESS

(71) Applicant: BRITISH TELECOMMUNICATIONS PUBLIC LIMITED COMPANY, London (GB)

(72) Inventors: Fadi El-Moussa, London (GB); Theo Dimitrakos, London (GB); Georgios Vafiadis, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 136 days.

(21) Appl. No.: 15/038,833

(22) PCT Filed: Nov. 13, 2014

(86) PCT No.: PCT/GB2014/000466
§ 371 (c)(1),
(2) Date: May 24, 2016

(87) PCT Pub. No.: WO2015/079196
PCT Pub. Date: Jun. 4, 2015

(65) Prior Publication Data
US 2017/0237563 A1 Aug. 17, 2017

(30) Foreign Application Priority Data
Nov. 27, 2013 (EP) .................................. 13250112

(51) Int. Cl.
*H04L 29/06* (2006.01)
*H04L 9/32* (2006.01)
(Continued)

(52) U.S. Cl.
CPC .......... *H04L 9/3226* (2013.01); *G06F 3/0622* (2013.01); *G06F 3/0659* (2013.01);
(Continued)

(58) Field of Classification Search
CPC ................................. G06F 21/78; G06F 21/10
See application file for complete search history.

(56) References Cited

U.S. PATENT DOCUMENTS

2002/0001395 A1* 1/2002 Davis ...................... G06F 21/10
  382/100
2007/0255963 A1* 11/2007 Pizano ..................... G06F 21/32
  713/189
(Continued)

FOREIGN PATENT DOCUMENTS

EP 1 288 942 3/2003

OTHER PUBLICATIONS

International Search Report for PCT/GB2014/000466 dated Feb. 27, 2015, 3 pages.
(Continued)

*Primary Examiner* — Jason K Gee
(74) *Attorney, Agent, or Firm* — Nixon & Vanderhye P.C.

(57) ABSTRACT

A method for securely accessing a hardware storage device connected to a computer system, the hardware storage device having a unique hardware identifier and the computer system including a processor, the method comprising: an agent software component receiving the identifier of the storage device to authenticate the storage device, wherein the agent executes in an unrestricted mode of operation of the processor such that the agent is a trusted software component; in response to the authentication, the agent accessing a secure data key for encrypting and decrypting data on the storage device, wherein the data key is accessible only to trusted agents executing in the unrestricted mode of the processor such that software executing in a user mode of the processor stores and retrieves data on the storage device only via the agent.

17 Claims, 6 Drawing Sheets

(51) Int. Cl.
*G06F 21/44* (2013.01)
*G06F 3/06* (2006.01)
(52) U.S. Cl.
CPC ............ *G06F 3/0673* (2013.01); *G06F 21/44* (2013.01); *H04L 63/0876* (2013.01)

(56) References Cited

U.S. PATENT DOCUMENTS

| | | | |
|---|---|---|---|
| 2010/0031056 A1* | 2/2010 | Harada | G06F 21/602 713/193 |
| 2012/0170913 A1 | 7/2012 | Isozaki et al. | |
| 2015/0040235 A1* | 2/2015 | Byrne | G06F 21/78 726/26 |

OTHER PUBLICATIONS

Written Opinion of the ISA for PCT/GB2014/000466 dated Feb. 27, 2015, 4 pages.

* cited by examiner

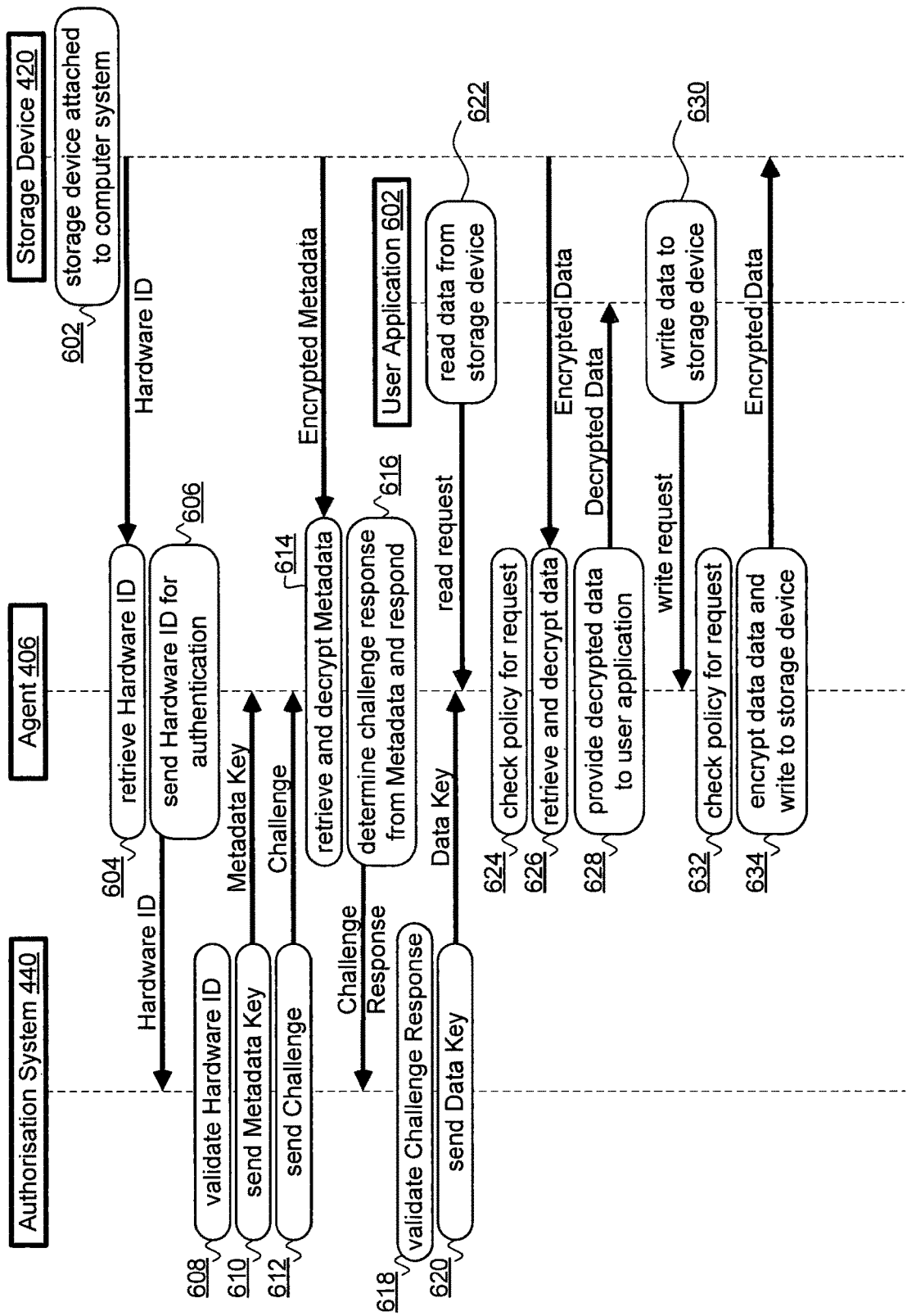

CONTROLLED STORAGE DEVICE ACCESS

This application is the U.S. national phase of International Application No. PCT/GB2014/000466 filed 13 Nov. 2014 which designated the U.S. and claims priority to EP Patent Application No. 13250112.3 filed 27 Nov. 2013, the entire contents of each of which are hereby incorporated by reference.

FIELD OF THE INVENTION

The present invention relates to controlled access to hardware storage devices. In particular it relates to controlled access for exchangeable hardware storage devices.

BACKGROUND OF THE INVENTION

Computer systems are at risk of infection and data compromise either arising from proactive attack, through passive data loss or incidental or accidental infection. Traditionally the primary route for such problems has been via network connections such as connections outside a secure company intranet or connections through unsecured or public networks. Techniques are readily deployed to restrict such network connections including firewalls, proxies and filters. Further, techniques can be employed to detect and potentially deal with infections as they arise. Infections can include computer viruses, malware, trojans and worms. Data compromise can include intentional or accidental disclosure of secret, sensitive, confidential or otherwise proprietary data, or intrusion or unauthorised access by third parties.

While current approaches to network security seek to address these problems, new problems arise due to the increased availability and reduced cost of hardware storage devices capable of being attached to otherwise secure, private or proprietary computer systems or networks of computer systems. Hardware data storage devices for computer systems are increasingly portable and exchangeable using wired or wireless interfaces. For example, a data storage device can be attached to a personal computer, console, terminal, tablet or other computing device via, inter alia, a network interface, a parallel interface such as an interface conforming to IEEE 1394, a serial interface such as a universal serial bus (USB), or a proprietary interface. Further, hardware data storage devices are increasingly produced with compact and convenient form factor such as, for example, memory cards, flash drives, memory sticks, USB hard drives and USB flash drives. Such devices are suitable for interfacing with computing equipment for the storage and retrieval of data and so constitute a further threat to the security and reliability of a computer system.

Hardware storage devices, and in particular, exchangeable hardware storage devices that are designed to be readily exchanged between computer systems, can transfer a computer infection such as a worm, virus, malware, trojan or other infection from one system to another system as the storage device is exchanged between systems. Such infections can be transferred to the hardware storage device intentionally. Alternatively, such infections can be developed to take advantage of a susceptible hardware storage device to copy, transfer, or otherwise provide itself on a hardware storage device without the knowledge of a user. Additionally, exchangeable hardware storage devices provide a convenient and effective means for users to copy, move or otherwise store confidential, secret, sensitive or otherwise proprietary data from a secure computer system or network of computer systems. In such scenarios there is a balance to be struck between allowing users to take advantage of the convenience of such exchangeable hardware storage devices for efficient and effective data transfer, exchange and sharing, and the vulnerabilities introduced by the use of such devices. One such vulnerability includes the readiness with which data can be lost by way of loss or theft of the hardware storage device. Further, authorised users having malicious intent, or unauthorised users having gained access to a computer system, can take advantage of exchangeable hardware storage devices to copy, move or otherwise record data stored in a computer system or network of computer systems for unauthorised use. Such unauthorised use of data has received increasing attention in the media as information is said to "leak" from organisations in a seemingly uncontrollable way.

Techniques have been developed in attempt to address each of these concerns individually. For example, a hardware storage device can be scanned for rogue software prior to use, though such scanning processes (often undertaken by a virus scanner such as is typically also used for network security) require that a hardware storage device is "mounted" (i.e. made available to a computer system for applications to undertake input and output operations) in order that such a scan can take place. Mounting such a device introduces a vulnerability as the device becomes accessible to the file system of a computer system. Further, encryption of data on a hardware storage device can be effective at reducing or eliminating data loss in the event of device loss or theft, though such encryption cannot prevent intentional data copying by a malicious or unauthorised user. Currently the only way to prevent such malicious or unauthorised intentional data theft is by precluding the use of exchangeable hardware storage devices by, for example, preventing the mounting of such devices or by removal of associated interfaces. Such an approach is not ideal since the convenience of exchangeable hardware storage devices is no longer available.

Thus there is a need to provide a reliable and secure mechanism for enjoying the convenience and availability of exchangeable hardware storage devices while protecting against the aforementioned vulnerabilities.

SUMMARY OF THE INVENTION

The present invention accordingly provides, in a first aspect, a method for securely accessing a hardware storage device connected to a computer system, the hardware storage device having a unique hardware identifier and the computer system including a processor, the method comprising: an agent software component receiving the identifier of the storage device to authenticate the storage device, wherein the agent executes in an unrestricted mode of operation of the processor such that the agent is a trusted software component; in response to the authentication, the agent accessing a secure data key for encrypting and decrypting data on the storage device, wherein the data key is accessible only to trusted agents executing in the unrestricted mode of the processor such that software executing in a user mode of the processor stores and retrieves data on the storage device only via the agent.

Preferably the agent further receives a policy for the hardware storage device, the policy indicating operations that the agent is permitted to perform with respect to the hardware storage device.

Preferably the agent is securely communicatively connected to an authorisation system, the authorisation system securely storing the secure data key, and wherein the agent receives the secure data key from the authorisation system.

Preferably the storage device includes first and second partitions for information storage, the first partition as a data volume for storage of user data and being encrypted using the data key, and the second partition as a metadata volume for storage of metadata and being encrypted using a metadata key being different to the data key.

Preferably, authentication of the storage device further includes: communicating the hardware identifier to the authorisation system for authentication of the identifier; in response to receiving the metadata key from the authorisation system, the agent performing the steps of: a) retrieving and decrypting metadata from the second partition of the storage device; b) receiving a challenge request from the authorisation system to authenticate the metadata; c) communicating a response to the challenge to the authorisation system, the response being based on at least part of the decrypted metadata; and d) receiving an indication of whether the storage device is authenticated from the authorisation system.

Preferably the permitted operations include a read operation.

Preferably the permitted operations include a write operation.

Preferably the permitted operations are restricted to a predetermined time window.

Preferably the policy is received from the authorisation system.

The present invention accordingly provides, in a second aspect, a method of an authorisation system for authorising access to a hardware storage device connected to a computer system, the computer system being in secure communication with the authorisation system and including a processor and an agent software component executing in an unrestricted mode of the processor, the hardware storage device having a unique hardware identifier, the method comprising: receiving and validating the identifier of the storage device by reference to a store of valid identifiers; responsive to the validation of the identifier, communicating a metadata key and a security challenge to the agent; receiving a response to the security challenge and validating the response with reference to a store of valid responses; responsive to the validation of the response, communicating a secure data key to the agent for encrypting and decrypting data on the storage device, wherein the data key is accessible only to trusted agents executing in the unrestricted mode of the processor of the computer system such that software executing in a user mode of the processor stores and retrieves data on the storage device only via the agent.

The present invention accordingly provides, in a third aspect, a computer system for securely accessing a hardware storage device connected thereto, the hardware storage device having a unique hardware identifier and the computer system comprising: a processor for executing, in an unrestricted mode of the processor, an agent software component adapted to receive the identifier of the storage device to authenticate the storage device; in response to the authentication, the agent accessing a secure data key for encrypting and decrypting data on the storage device, wherein the data key is accessible only to trusted agents executing in the unrestricted mode of the processor such that software executing in a user mode of the processor stores and retrieves data on the storage device only via the agent.

Preferably the agent is further adapted to receive a policy for the hardware storage device, the policy indicating operations that the agent is permitted to perform with respect to the hardware storage device.

Preferably the agent is securely communicatively connected to an authorisation system, the authorisation system securely storing the secure data key, and wherein the agent receives the secure data key from the authorisation system.

Preferably the storage device includes first and second partitions for information storage, the first partition as a data volume for storage of user data and being encrypted using the data key, and the second partition as a metadata volume for storage of metadata and being encrypted using a metadata key being different to the data key.

Preferably the agent is further adapted to: communicate the hardware identifier to the authorisation system for authentication of the identifier; in response to receiving the metadata key from the authorisation system: a) retrieve and decrypting metadata from the second partition of the storage device; b) receive a challenge request from the authorisation system to authenticate the metadata; c) communicate a response to the challenge to the authorisation system, the response being based on at least part of the decrypted metadata; and d) receive an indication of whether the storage device is authenticated from the authorisation system.

The present invention accordingly provides, in a fourth aspect, an authorisation system for authorising access to a hardware storage device connected to a computer system, the computer system being in secure communication with the authorisation system and including a processor and an agent software component executing in an unrestricted mode of the processor, the hardware storage device having a unique hardware identifier, the authorisation system comprising: a first receiver adapted to receive and validate the identifier of the storage device by reference to a store of valid identifiers; a first communicator adapted to, responsive to the validation of the identifier, communicate a metadata key and a security challenge to the agent; a second receiver adapted to receive a response to the security challenge and validate the response with reference to a store of valid responses; a second communicator adapted to, responsive to the validation of the response, communicate a secure data key to the agent for encrypting and decrypting data on the storage device, wherein the data key is accessible only to trusted agents executing in the unrestricted mode of the processor of the computer system such that software executing in a user mode of the processor stores and retrieves data on the storage device only via the agent.

Preferably the hardware storage device is an exchangeable storage device designed to be exchangeable between multiple computer systems such as a USB drive or the like.

The present invention accordingly provides, in a fifth aspect, a computer program element comprising computer program code to, when loaded into a computer system and executed thereon, cause the computer to perform the steps of a method described above.

BRIEF DESCRIPTION OF THE DRAWINGS

A preferred embodiment of the present invention will now be described, by way of example only, with reference to the accompanying drawings, in which:

FIG. 6 is a state diagram illustrating an exemplary method of the authorisation system, agent, storage device and a user application executing in the restricted mode in accordance with embodiments of the present invention.

DETAILED DESCRIPTION OF THE PREFERRED EMBODIMENTS

Figure 1:
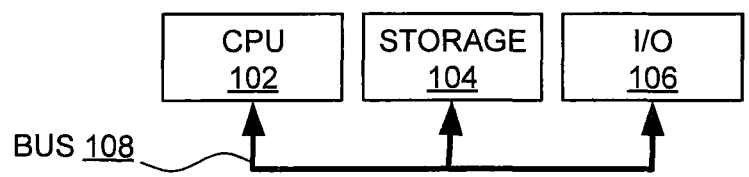
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
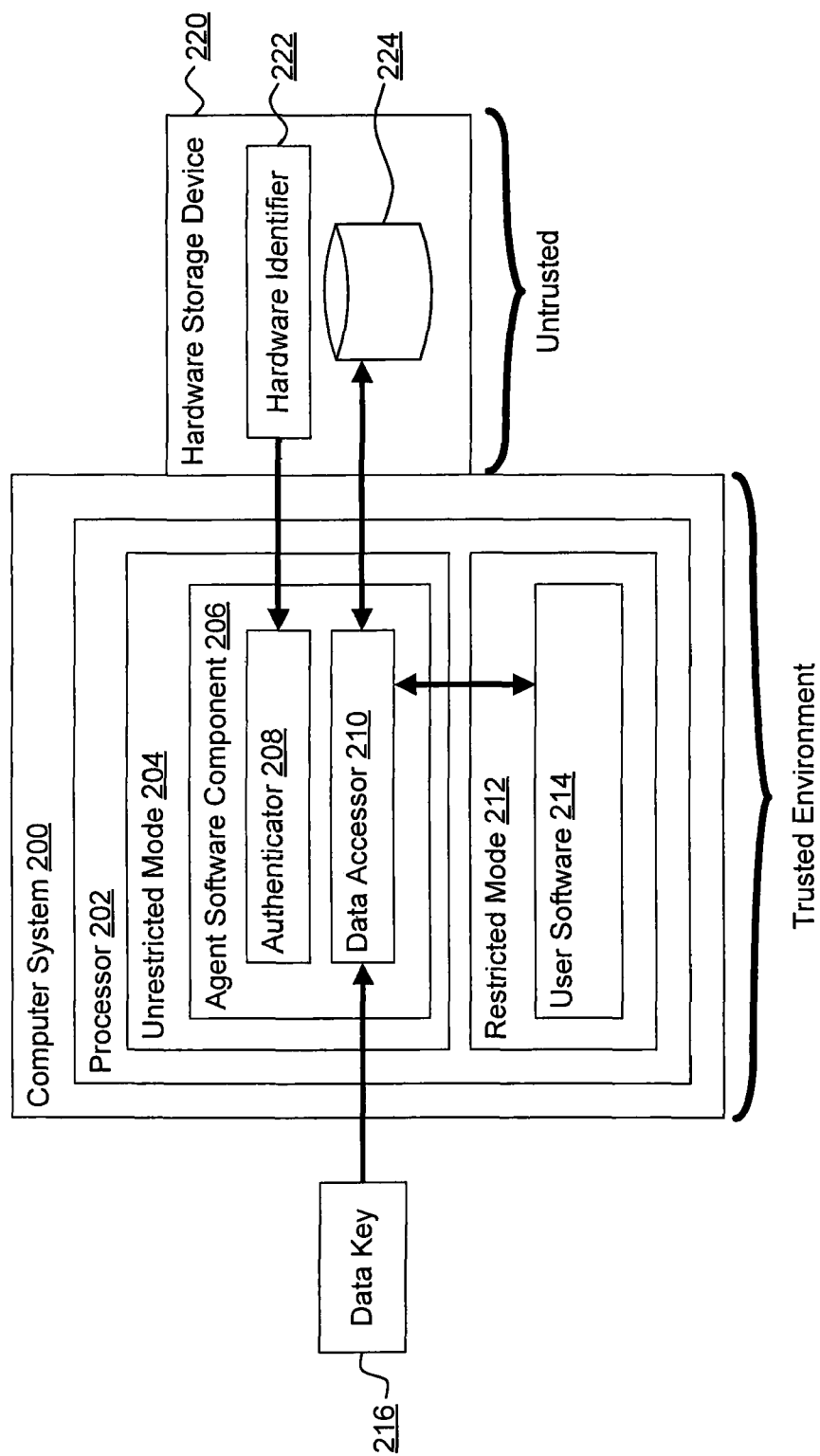
FIG. 2 is a component diagram of a hardware storage device being attached to a computer system in accordance with a first exemplary embodiment of the present invention.

FIG. 2 is a component diagram of a hardware storage device 220 being attached to a computer system 200 in accordance with a first exemplary embodiment of the present invention. The hardware storage device 220 is most preferably an exchangeable hardware storage device designed to be exchanged between computer systems such as a USB stick, USB flash drive, USB hard drive, IEEE 1394 drive, memory card, memory stick or other suitable exchangeable hardware storage device as will be apparent to those skilled in the art. The hardware storage device 220 includes a data storage component 224 such as a flash memory, a solid state drive, a magnetic storage such as a magnetic disk or any other suitable data storage medium. Data stored in the data storage component 224 is encrypted using a suitable key-based encryption scheme such as Advanced Encryption Standard (AES) encryption. Preferably data stored in the data storage component 224 is encrypted using the xor-encrypt-xor based tweaked codebook mode with ciphertext stealing (known as XTS or XTS-AES) such as is described in IEEE 1619 "Standard Architecture for Encrypted Shared Storage Media".

The hardware storage device 220 further includes a hardware identifier 222 that is intended to be unique to the hardware storage device 220 such as a machine readable serial number specific to the storage device 220. Most preferably, the hardware identifier 222 is provided by a manufacturer or assembler of all or part of the hardware storage device 220 such as a unique hardware serial number stored with or in association with the storage device 220 such that the hardware serial number is readable programmatically by privileged software code such as code operating in an unrestricted mode of operation of a computer processor. Notably, the hardware serial number is not a volume serial number that is applied to a logical data storage volume as part of a volume creation or formatting procedure. Such volume serial numbers can change whenever a volume is created or recreated and thus are susceptible to changing or spoofing. Further, such hardware identifier is not determined based on a user level information store or registry, such as the registry in Microsoft Windows or operating system environment variables, since such secondary storage of the hardware identifier is susceptible to modification, interception or spoofing (Microsoft and Windows are trademarks or registered trademarks of Microsoft Corp.) Rather, the hardware identifier 222 is stored for the hardware storage device 220 such as in a read-only memory or register of the storage device 220, for reading by unrestricted mode software.

The hardware storage device 220 is attached to the computer system 200 by way of a wired or wireless interface such as a USB, IEEE 1394, memory card or other suitable interface for the hardware storage device 220. Preferably the hardware storage device is designed to be exchanged between computer systems and accordingly the interface is preferably provided as an external interface of the computer system 200 such that the interface is readily accessible to a user of the computer system 200. In contrast, traditional storage device interfaces include small computer system interface (SCSI), serial and parallel advanced technology attachment interfaces (SATA and PATA), integrated drive electronics (IDE) and other such similar storage device interfaces which are typically provided internally to a computer system and are typically not intended for devices designed to be readily exchangeable between computer systems. However, where such interfaces are provided so as to facilitate ready exchange of a hardware storage device, embodiments of the present invention can be equally applicable. An interface for such ready exchange of a hardware storage device can be characterised by the interface being readily accessible without dismantling or removing a case from a computer system, and the interface supporting, in conjunction with appropriate operating software, the runtime attachment and detachment of hardware storage devices without rebooting, restarting or reconfiguring the computer system.

Attachment to the computer system 200 by the hardware storage device 220 is characterised by the physical connection of the storage device 220 to the computer system 200. Such physical connection can manifest in a cable, connector, plug and socket or other physical connection means for electrically and communicatively coupling the hardware storage device 220 to the computer system 200. Where attachment is achieved by way of a wireless interface, such physical connection can include the passage of electromagnetic or other suitable signals between the storage device 220 and the computer system 200. Notably, attachment does not imply or infer that the hardware storage device 220 is accessible to software executing in a restricted operating mode of a processor of the computer system, such as applications. To be accessible to such restricted software the hardware storage device 220 must be logically accessible in the sense that software, operating systems, kernels and drivers to facilitate the access to, and storage of, data in the data storage component 224 of the hardware storage device 220 are operable. In embodiments of the present invention such logical accessibility is achieved only when provided by, and via, an agent software component 206 as will be described in detail below. Such logical accessibility can be referred to as "mounting" or assigning the hardware storage device to a point, directory, location or other logical situation in a file system.

The computer system 200 includes a processor 202 such as a central processing unit (CPU) as are well documented and well known to those skilled in the art. The processor 202 includes at least two modes of operation. The two modes include an unrestricted mode of operation 204 and a restricted mode of operation 212. Such modes of operation of the processor 202 are also known as processor modes, CPU states, CPU privilege levels and other names as will be apparent to those skilled in the art. The operating mode of the processor 202 is a mode of executing processor instructions by the processor 202 by placing or lifting restrictions on the type and scope of operations that can be performed by certain processes being run by the processor 202. In principle the provision of multiple modes of operation provides for operating systems, kernels and device drivers to execute with more privileges than user level and application software. The unrestricted mode of operation 204 is sometimes known as a kernel mode, master mode, supervisor mode, privileged mode or supervisor state. Generally, processors operating in the unrestricted mode 204 can perform any operation allowed by a processor architecture including the execution of any instruction, any I/O operation and access to any area of memory whether physical memory or device mapped memory (such as, for example, registers of a hardware storage device 220 storing a hardware identifier 222). It will be apparent to those skilled in the art that, in some processor architectures or configurations, even in the unrestricted mode 204 there are some instructions or address ranges that are restricted, such as may be restricted for security or policy purposes. Nonetheless it can be regarded that substantially all instructions and substantially all address ranges required for execution of an operating system, memory management functions, input/output operations and peripheral and device access and management are generally accessible in the unrestricted mode 204. The restricted mode of operation 212 is sometimes known as a user mode, slave mode or problem state. Processors operating in the restricted mode 212 are subject to restrictions that can be enforced by processor hardware. Such restrictions can include restrictions on which instructions can be executed (such as restrictions on performing I/O operations) and restrictions on memory or address ranges that can be accessed. In this way, a kernel, operating system and/or device drivers operating in the unrestricted mode 204 provide trusted facilities as trusted software components to other software operating in the restricted mode 212.

An agent software component 206 operates as a trusted executable software component in the unrestricted mode 204. In one embodiment, the agent software component 206 is provided as an unrestricted mode device driver for cooperating with an operating system of the computer system 200. Alternatively, the agent software component 206 is provided as a module or function of an operating system operating in the unrestricted mode 204, such as a kernel module compiled for and linked with a kernel of an operating system, such as a Linux kernel (Linux is a trademark or registered trademark of Linus Torvalds.) The agent software component 206 is adapted to perform at least two key functions with respect to the hardware storage device 220. Specifically, the agent software component 206 prompts an authentication function for the storage device 220, such as by way of an authenticator software component 208. Further, the agent software component 206 provides access to the data storage component 224 of the storage device 220 on behalf of other software components 214 operating in the restricted mode 212. Such access can be provided by way of the data accessor 210 component. Each of these functions will be considered in turn.

The authenticator 208 is a software or hardware function of the agent 206 for prompting or undertaking the authentication of attached hardware storage device 220. The authentication can be performed by the authenticator 208 or, alternatively, the authentication can be performed by an authentication service provided by a separate entity such as an authorisation system as will be described below with respect to FIG. 4. Authentication involves determining the identification of the hardware storage device 220 in order to determine whether the hardware storage device 220 is authorised to be accessed by the computer system 200. The identification of the hardware storage device 220 is determined by accessing the hardware identifier 222 of the storage device 220 by the authenticator 208. The hardware identifier 222 is accessible to the authenticator 208 since the authenticator 208 constitutes part of the agent 206 operating in the unrestricted mode 204. Additionally or alternatively, the authentication can involve determining the identification of the hardware storage device 220 in order to identify operations that the agent 206 is permitted to perform with respect to the hardware storage device 220, such operations being defined by a policy for the hardware storage device 220. Such a policy can be stored in association with the agent 206, such as collocated with the agent 206 in a secure storage of the computer system 200 such as a storage accessible only to software executing in the unrestricted mode 204. Alternatively, such policy can be stored in a separate entity such as a second computer system securely communicatively connected to the computer system 200. A policy can include an identification of a hardware storage device 220 or a class or attribute of hardware storage device 220, such as a type, model, ownership or other securely determinable attribute of the hardware storage device 220. The policy further can include an indication of operations permitted or precluded for the hardware storage device 220. Such operations can include permission or restriction of the ability to: mount the hardware storage device 220 such as by mapping the hardware storage device to a location in a file system of the computer system 200 for access by applications; write data to the hardware storage device 220 so as to record data in the data storage component 224 of the storage device 220; read data from the hardware storage device 220 such as reading information stored in the data storage component 224; and perform mount, read and/or write operations under particular circumstances such as during particular times of day or during a particular time and/or date period, or at a particular location such as a particular network location, geographic location, or in proximity to a particular device such as a connected or wireless authorisation or security device. In embodiments of the present invention, any such operations indicated for the hardware storage device 220 are implemented via the agent 206 as will be described below. A policy can be implemented as a secure data structure, database or access control function or list as will be familiar to those skilled in the art. It will be appreciated that such a policy or other authentication data structure, such as a list of authorised hardware identifiers, is stored securely in a trusted manner such that unauthorised modification or tampering of the policy or authentication data structure is substantially prevented. For example, suitable secure storage of the policy or authentication data structure can include: storage in a memory accessible only to software executing in the unrestricted mode 204; and storage in a second computer system being secured and trusted and being connected to the computer system 200 by way of a secure network connection such as a non-public, intranet or dedicated network connection. Thus, in use, the authenticator 208 is operable to authenticate the hardware storage device 220 with reference to the hardware identifier 222 accessible to the agent 206 operating in the unrestricted mode 204. Since the hardware identifier 222 is accessed directly, it is not susceptible to spoofing, modification or interception.

The agent 206 further includes a data accessor 210 component as a software or hardware component operating with, or as part of, the agent 206 in the unrestricted mode 204. The data accessor 210 is adapted to access data stored in, and to store data in, the data storage component 224 of the storage device 220. Data in the data storage component 224 is encrypted using key-based encryption and so the data accessor 210 accesses a data key 216 for encrypting and decrypting data in the data storage component 224. The data key 216 can be provided in association with, or collocated with, the agent 206. Alternatively, the data key 216 can be provided by a secure alternative computer system in secure communication with the computer system 200. The data key 216 is preferably specific to the hardware storage device 220 and can be identified with reference to the hardware identifier 222 of the storage device 220.

The data accessor 210 is operable in response to the authentication by the authenticator 208 such that access to the data storage component 224 by the data accessor 210 is restricted to access permitted by the authenticator 208. Thus, if the authenticator 208 determines that access should be precluded, the data accessor 210 precludes access to the data storage component 224. Alternatively, if the authenticator 208 determines that read and/or write access is permitted, the data accessor 210 provide such operations. The data accessor 210 provides facilities to user software 214 executing in the restricted mode 212 in order that user software 214 can access and/or store data on the data storage component 224 of the hardware storage device 220. User software 214 is software executing in the restricted mode 212 of the processor 202 such as user applications, user interface functionality of an operating environment such as a shell or desktop environment, a file system browser or file system manager software etc. The user software 214 is precluded from accessing the hardware storage device 220 except via the agent 206. In one embodiment this is achieved by installing the agent 206 as a device driver for the hardware storage device 220, the device driver executing in the unrestricted mode 204 and receiving input/output requests from user software 214 for input/output operations on the hardware storage device 220. Thus, in such an embodiment, the user software 214 is adapted to access the agent 206 such as via an operating system, kernel, direct device driver connection or a library of an operating system or kernel.

Thus, in use, the attachment of the hardware storage device 220 prompts the operation of the agent 206 in the unrestricted mode 204. Access to the hardware storage device 220 is precluded except via the agent 206. The agent 206 initially prompts or undertakes authentication of the hardware storage device 220 based on the hardware identifier 222. In response to the authentication and, in some embodiments, with reference to and in accordance with a stored policy for the hardware storage device 220, the agent provides access to the hardware storage device 220 for user software 214 operating in the restricted mode 212.

Figure 3:
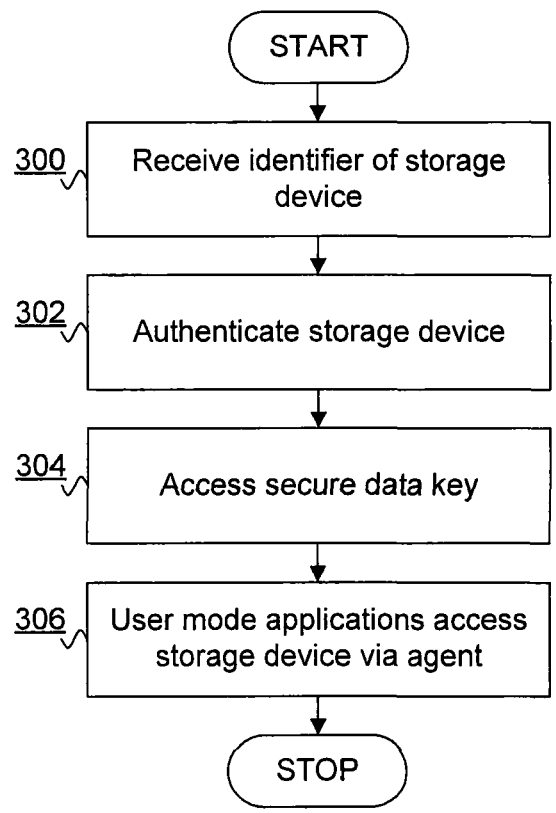
FIG. 3 is a flowchart of a method of the agent software component of FIG. 2 in accordance with the first exemplary embodiment of the present invention.

FIG. 3 is a flowchart of a method of the agent software component 206 of FIG. 2 in accordance with the first exemplary embodiment of the present invention. Initially, at step 300, the agent 206 receives the hardware identifier 222 for the hardware storage device 220. At step 302 the agent 206 authenticates the hardware storage device 220. In some embodiments the agent 206 prompts authentication which is undertaken securely by an alternative component or computer system. At step 304 the agent 206 accesses the secure data key 216 such as by receiving the data key 216 from a trusted secure server. At step 306 the agent 206 provides access to the storage device 220, such as read and/or write access, to user software 214 operating in the restricted mode 212, such access being in accordance with any restrictions or policies determined as part of, or in association with, the authentication of the storage device 220.

Thus the first embodiment of the present invention provides for access to an exchangeable hardware storage device 220 when the device 220 is authenticated using a hardware device identifier 222. Data is stored on the device 220 using a data key 216 which is accessible only to trusted agent software components 206 executing in an unrestricted mode 204 of operation of a computer processor 202. Encrypted data stored on the storage device 220 is accessible using the data key 216 accessed only when authentication is complete. The authentication is undertaken by the agent software component 206 such that the authentication can be completed before the hardware storage device is made available, such as by being mounted, for restricted mode applications 214 to access. The agent software component 206 further provides an accessor interface 210 through which all data storage and retrieval by user software 214 executing in a restricted mode 212 of operation of the processor 202 must pass. In this way, the hardware storage device 220 is prevented from being mounted by the computer system 200 until authentication is complete, so preventing infection by viruses, worms, trojans or other malicious software that may be stored on the hardware storage device. Further, restricting access to the data key 216 such that only trusted agents 206 operating in the unrestricted operating mode 204 prevents access to the data stored in a data storage component 224 of the hardware storage device 220 except where the storage device 220 is connected to an authorised computer system 200 having such trusted agent component 206. Thus, in this way, loss of the hardware storage device 220 will not compromise the data stored thereon due to the data being encrypted. Further, data copied to the storage device 220 cannot be retrieved from the storage device 220 except by a computer system 200 having such trusted agent software component 206 operating in the unrestricted mode 204. Thus, data theft or leakage is prevented.

Figure 4:
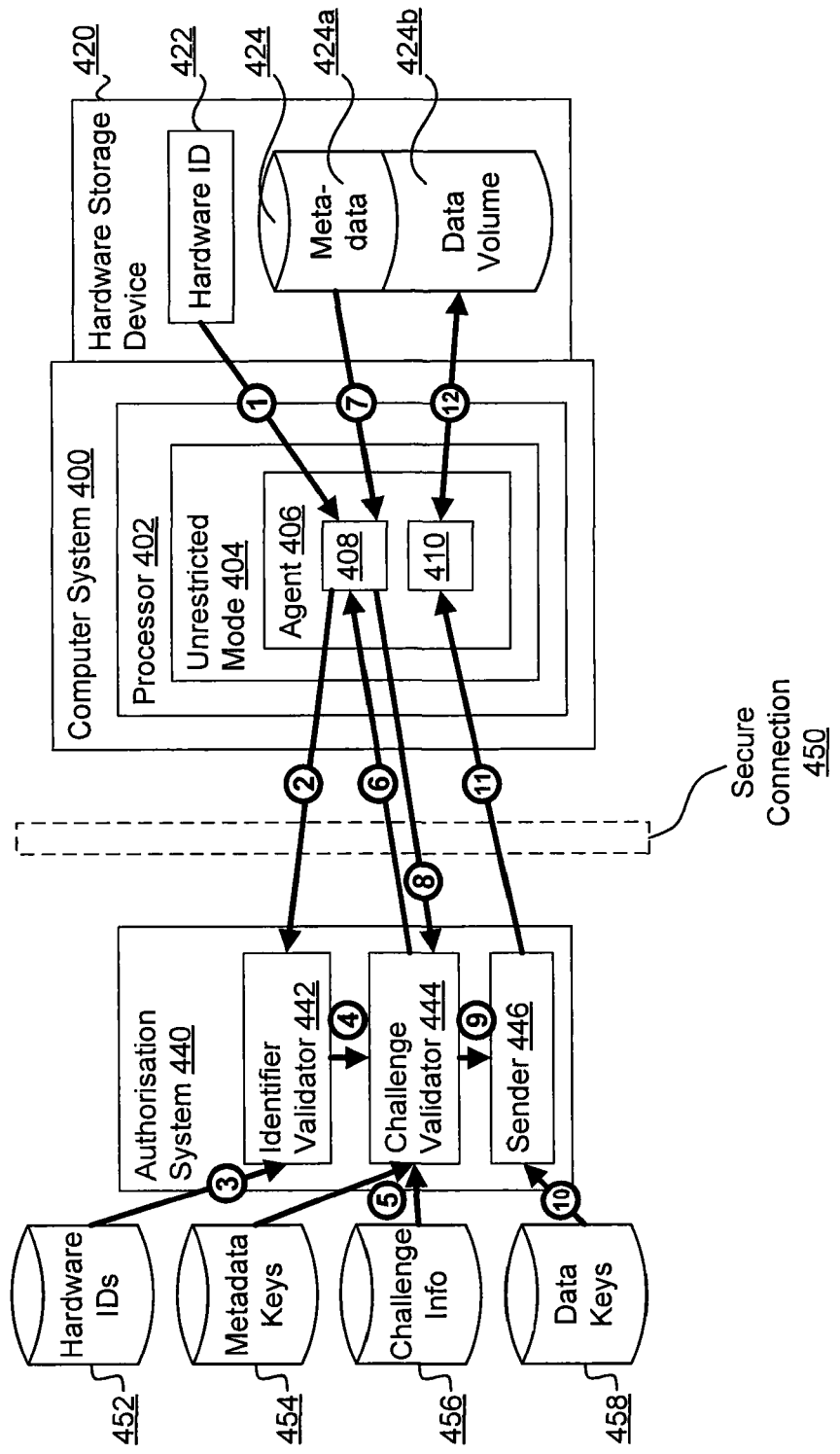
FIG. 4 is a component diagram of a hardware storage device being attached to a computer system in accordance with second exemplary embodiment, of the present invention.

FIG. 4 is a component diagram of a hardware storage device 420 being attached to a computer system 400 in accordance with second exemplary embodiment of the present invention. Many of the features of FIG. 4 are identical to those described above with respect to FIG. 2 and these will not be repeated here. The depiction of the computer system 400 of FIG. 4 is simplified by omitting to illustrate user software 214 executing in the restricted mode 212 though it will be appreciated by those skilled in the art that such features will exist also in arrangements in accordance with the embodiment of FIG. 4. The computer system 400 of FIG. 4 is securely communicatively connected via a secure connection 450, such as a secure wired or wireless connection or a secure network connection, to an authorisation system 440. The authorisation system 440 is comprised of one or more computer systems adapted to carry out all or part of the functions of authentication and provision of the data key 216 for agent 406. The authorisation system 440 is a trusted system, such as a system operating in a reliable trusted environment like a secure environment isolated and/or restricted from communication with other computer systems except by way of the secure connection 450. In one embodiment the authorisation system can be constituted within the computer system 400, in which embodiments the functions of the authorisation system described below preferably operate in a secure, segregated or partitioned manner such that user software 214 of the computer system 400 is prevented from accessing the authorisation system 440 except via strict access control measures to substantially assure the security of the authorisation system 440.

The data storage component 424 of the storage device 420 of FIG. 4 is adapted to be constituted of at least two parts: a metadata part 424a; and a data part 424b. The division of the data storage component 424 can be achieve by any suitable means such as: partitioning of the data storage component into multiple logical partitions; separation of storage in the data storage component into two categories of storage; and the provision of discretely separate data storage components as part of the hardware storage device 420, such as separate disks or memory. Each of the metadata part 424a and data part 424b is encrypted using a key based encryption such as been described above with respect to the data storage component 224 of FIG. 2. The keys for encryption/decryption of the metadata part 424a are different to the keys for encryption/decryption of the data part 424b. Specifically, the metadata part 424a uses a metadata key while the data part uses a data key 216. The metadata part 424a stores metadata associated with the hardware storage device 420 for use in further authenticating the storage device 420 by way of a challenge-response protocol as will be described below. Such metadata can include, inter alia, any or all of: one or more names of users, owners or administrators associated with the storage device 420; one or more shared secrets; one or more company, employer or organisation names associated with the storage device 420 or users, owners or administrators; date and/or time information relevant to the storage device 420, such as a time of creation, manufacture, formatting or preparation of the storage device 420; and digital certificates or digital signatures associated with authorised users, owners, administrators, organisations or other entities associated with the storage device 420.

The authorisation system 440 provides authentication facilities for the agent 406 such that the authenticator 408 of the agent 406 cooperates with functions of the authentication system 440 to prompt, undertake and act on authentication of the hardware storage device 420. The authorisation system 440 includes an identifier validator 442 as a software or hardware component for validating the hardware identifier 422 of the storage device with reference to a store of hardware identifiers 452. In one embodiment, the store of hardware identifiers 452 can identify only authorised hardware storage devices with reference to a hardware identifier 422. Alternatively, the store of hardware identifiers 452 can identify a mapping between hardware identifiers and other hardware information for storage devices, such as manufacturer identifiers, model identifiers, capacity information or other information suitable for authenticating the authenticity of a hardware storage device 420.

The authorisation system 440 further includes a challenge validator 444 as a hardware or software component for providing a metadata key from a store of metadata keys 454 to the agent 406 in order that the agent 406 can access encrypted metadata stored in the metadata part 424a of the data storage component 424. The challenge validator is further operable to generate a challenge for the agent 406 based on metadata stored in the metadata part 424a as a further authentication and authorisation measure for the hardware storage device 420. Thus, in one embodiment, information from, about or stored in the metadata part 424a is replicated in a challenge information data store 456 such that a challenge can be generated to test the authenticity of the hardware storage device 420. Such information from, about or stored in the metadata part 424a can be provided in the challenge information store 456 as part of a process of securely preparing, formatting or configuring the hardware storage device 420 for first use. The challenge validator 444 is further adapted to receive a challenge response from the agent 406 and determine the acceptability of such challenge response.

The authorisation system 440 further includes a sender component 446 as a hardware or software component for providing a data key 216 from a store of data keys 458 to the agent 406 in order that the data accessor 410 of the agent 406 can retrieve and record data in the data part 424b of the data storage component 424 as described above with respect to FIG. 2.

While the various data stores 452, 454, 456 and 458 have been illustrated as external to the authorisation system 440, it will be appreciated that any or all of the stores 452, 454, 456 and 458 can be provided as part of the authorisation system 440 provided that the stores 452, 454, 456 and 458 are provided in a substantially reliable and secure manner in order to reduce the prospect of unauthorised access to, or modification of, the stores 452, 454, 456 and 458 or data stored therein.

The operation of the arrangement of FIG. 4 in use will now be described with reference to the numbered steps circled in FIG. 4. Initially, at step 1, the authenticator 408 accesses the hardware identifier 422. At step 2 the hardware identifier 422 is communicated to the identifier validator 442 for validation with reference to the store of hardware identifiers 452 received at step 3. The identifier validator 442 provides an indication of successful authentication of the hardware identifier 422 to the challenge validator 444 at step 4. The challenge validator 444 retrieves a metadata key for the hardware storage device 420 from metadata key store 454 at step 5 (preferably based on the hardware identifier 422). Also at step 5, the challenge validator 444 further receives challenge information to generate a challenge from the challenge information store 456. At step 6 the challenge validator 444 provides the metadata key and the challenge securely to the authenticator 408 of the agent 406 at step 6. At step 7 the authenticator 408 accesses the metadata part 424a of the data storage component 424 using the metadata key and determines a response to the challenge. The authenticator 408 communicates a response to the challenge at step 8 which is validated by the challenge validator 444. The challenge validator 444 provides an indication to the sender 446 at step 9 if the response to the challenge is correct. At step 10 the sender retrieves a data key 216 from a data key store 458 for the hardware storage device 420 (preferably based on the hardware identifier 422). At step 11 the sender 446 securely communicates the data key 216 to the data accessor 410 of the agent 406 in order that the data accessor 410 can provide access to and storage of data in the data part 424b of the data storage component 424 for user software 214 operating in the restricted mode 212 at step 12.

In one embodiment, the authorisation system 440 is further adapted to provide storage device access policy information to the agent 406 identifying data storage device operations that are permitted or precluded by the agent 406. Such a policy can be stored in a separate data store (not illustrated) in association with individual hardware storage devices (e.g. based on hardware identifiers) or for classes of storage devices (e.g. based on characteristics or attributes of the hardware storage device, such as may be recorded for the hardware storage device for access by the authorisation system or as may be recorded in the metadata part 424a of the data storage component).

While the authentication system 440 is illustrated as comprising multiple component 442, 444 and 446, it will be appreciated by those skilled in the art that such componentisation of the authorisation system 440 is purely exemplary and that any suitable componentisation of the functions and facilities of the authorisation system 440 can be employed including a single component providing all functions and facilities of the authorisation system 440. Further, the division of functions and facilities between the authorisation system 440 and the agent 406 illustrated in FIG. 4 is purely exemplary and some of the features of the authorisation system 440 could equally be provided as part of, or in association with, the agent 406 and vice versa.

Figure 5:
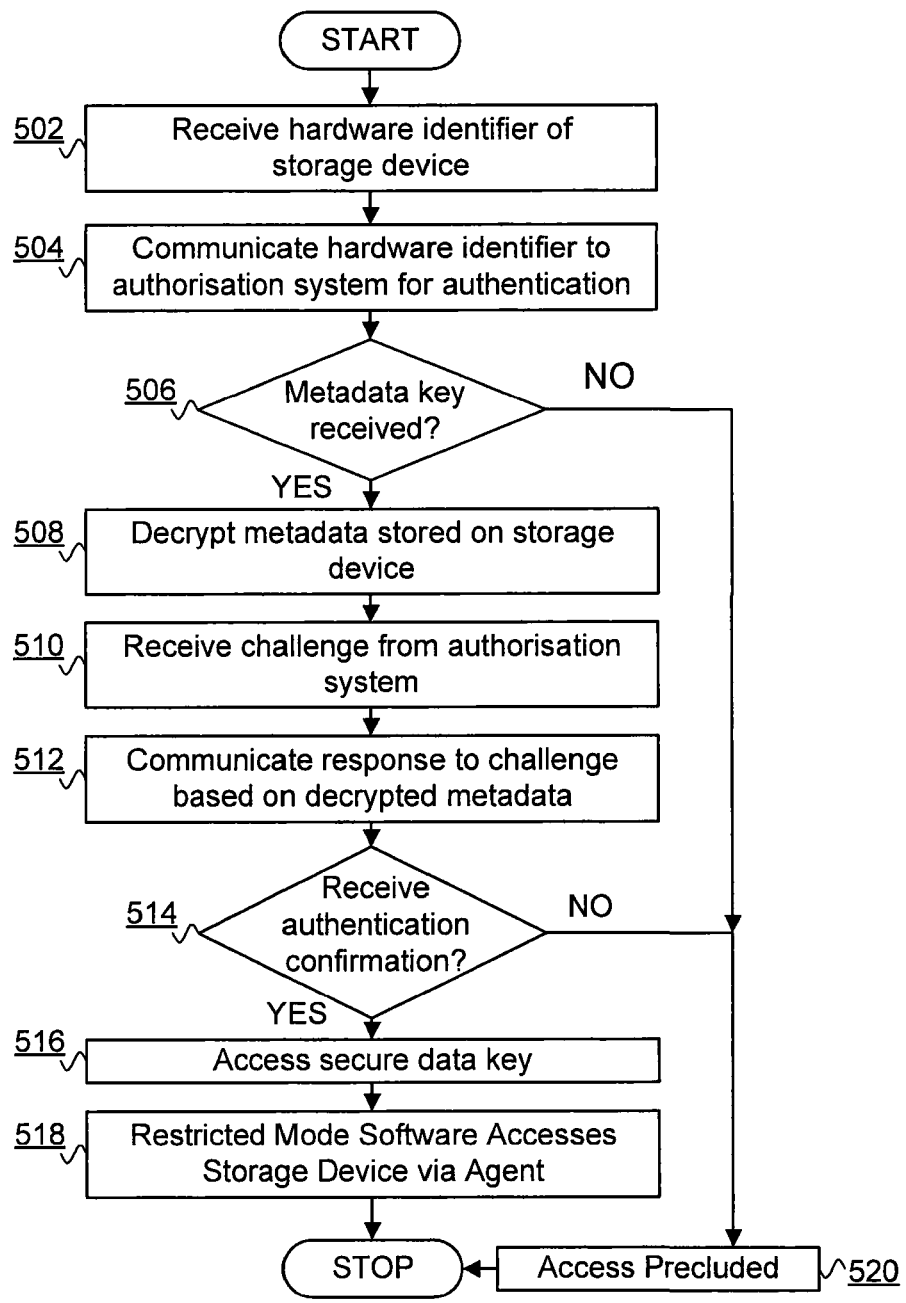
FIG. 5 is a flowchart of a method of the agent software component of FIG. 4 in accordance with the second exemplary embodiment of the present invention.

FIG. 5 is a flowchart of a method of the agent software component 406 of FIG. 4 in accordance with the second exemplary embodiment of the present invention. Initially, at step 502, the agent 406 receives the hardware identifier 422 of the hardware storage device 420. At step 504 the agent 406 communicates the hardware identifier to the authorisation system 440 for authentication. At step 506 the agent 406 determines if a metadata key is received from the authorisation system 440 as an indication of successful authentication of the hardware identifier 422. While receipt of the metadata key is illustrated to indicate successful authentication, it will be appreciated that any suitable indication can be used. Where the metadata key is determined to be not received at step 506, the method concludes that access is precluded at step 520 and terminates. Where the metadata key is determined to be received at step 506, the method decrypts the metadata stored in the metadata part 424a of the data storage component 424 at step 508. At step 510 the method receives a challenge from the authorisation system 444. The agent 406 determines a response to the challenge and communicates the response at step 512. If authentication is not confirmed at step 514, the method concludes that access is precluded at step 520 and terminates. Alternatively, if authentication is confirmed at step 514 the method accesses a secure data key 216 at step 516, such as by receiving the data key 216 from the authorisation system 440. At step 518 the agent 406 provides access to, and storage of, data in the data part 424b of the data storage component 424 for software executing in the restricted mode 212.

FIG. 6 is a state diagram illustrating an exemplary method of the authorisation system 440, agent software component 406, hardware storage device 420 and a user application 602 executing in the restricted mode 212 in accordance with embodiments of the present invention. Initially, at step 602, the hardware storage device 420 is attached to the computer system 400 such as by being connected to the computer system by a cable via an interface of the computer system. At step 604 the agent 406 retrieves the hardware identifier 422 of the storage device 420 and at step 606 the agent 406 securely communicates the hardware identifier 422 to the authorisation system 440. At step 608 the authorisation system validates the hardware identifier 422 with reference to a store 452 of hardware identifiers. In response to successful validation of the hardware identifier 422, the authorisation system 440 securely communicates a metadata key to the agent 406 at step 610. The authorisation system 440 further communicates a challenge to the agent 406 at step 612. The agent 406 receives and decrypts the encrypted metadata stored in the metadata part 424a of the data storage component 424 at step 614. At step 616 the agent 406 determines a response to the challenge and securely communicates the response to the authorisation system 440. At step 618 the authorisation system 440 validates the challenge response and at step 620 the authorisation system 440 sends a data key 216 to the agent for access to the data part 424b of the data storage component 424. In some embodiments, the authorisation system 440 further provides policy information to the agent 406 so as to indicate what functional operations with respect to the hardware storage device 420 are authorised, such as mounting of, reading data from and/or writing data to the hardware storage device 420.

The state diagram of FIG. 6 further illustrates two exemplary data operations performed by a user application 602 operating in a restricted mode 212 of the processor 402: a data read operation at steps 622 to 628 ("read"); and a data write operation at steps 630 to 634 ("write"). In the "read" example, at step 622 the agent 406 receives a request to read data from the data storage device 420 from the user application 602. At step 624 the agent 406 verifies that the request complies with any applicable policies for operations relating to the data storage device 420. If policies are satisfied, the agent retrieves the required data from the data part 424b of the data storage component 424 at step 626 and decrypts the retrieved data using the data key 216. At step 628 the agent 406 supplies the retrieved data to the restricted mode application 602.

In the "write" example, at step 630 the agent 406 receives a request to write data to the data storage device 420 from the user application 602. At step 632 the agent 406 verifies that the request complies with any applicable policies for operations relating to the data storage device 420. If policies are satisfied, the agent encrypts the data for writing using the data key 216 and writes the encrypted data to the data part 424b of the data storage component 424 at step 634.

Figure 7C:
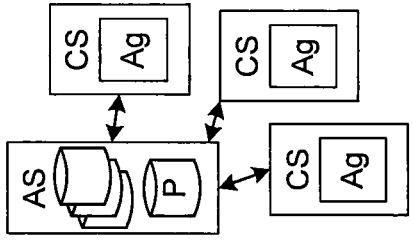
FIGS. 7a to 7f are component diagrams depicting illustrative exemplary arrangements of computer systems and authorisation systems in accordance with various embodiments of the present invention.
Figure 7F:
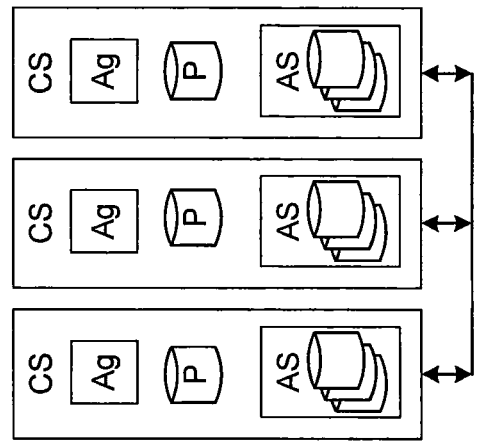

While numerous arrangements of the computer system 220, 420, authorisation system 440, executable software agent 406 and policy information have been illustrated and described, it will be appreciated that such arrangements are purely exemplary and many alternative arrangements could alternatively be employed. FIGS. 7a to 7f are component diagrams depicting illustrative exemplary arrangements of computer systems 400 and authorisation systems 440 in accordance with various embodiments of the present invention. FIG. 7a illustrates an arrangement in which the authorisation system 440 is securely communicatively connected to multiple computer systems 400 in a secure environment, each computer system 400 including an agent 406 operating in the unrestricted mode 404, such that the authorisation system 440 provides authentication and encryption key information to the agents 406 in response to the attachment of a hardware storage device 420 at one or more agents 406.

Figure 7B:
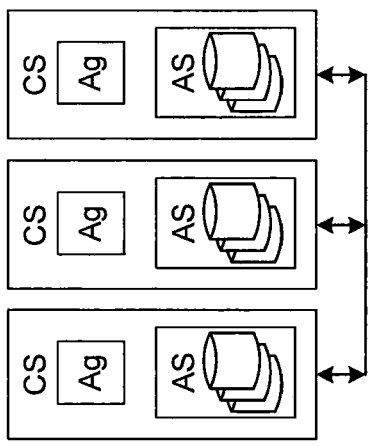

FIG. 7b illustrates an arrangement in which the authorisation system 440 is provided at each of one or more computer systems 400 to provide is facilities and functions to an agent 406 in each computer system 400. In such an arrangement the authorisation system 440 is provided in a secure and trusted manner such that the authorisation system 440 is substantially protected from intrusion and unauthorised access and use.

FIG. 7c illustrates an arrangement substantially the same as that of FIG. 7a and further including policy information "P" stored with, in or in association with the authorisation system 440. The policy information is securely communicated by the authorisation system 440 to computer systems 400 to indicate permitted or precluded operations that can be undertaken by a computer system 400 in respect of an attached hardware storage device 420.

Figure 7E:
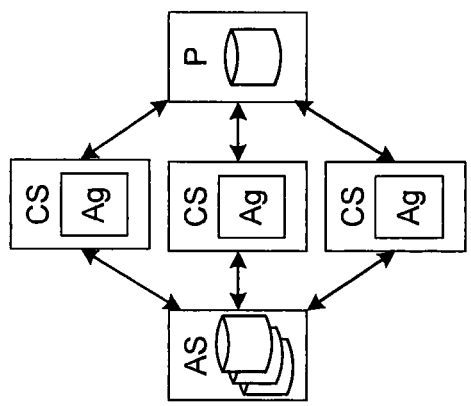
Figure 7A:
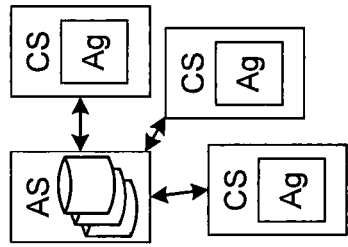
Figure 7D:
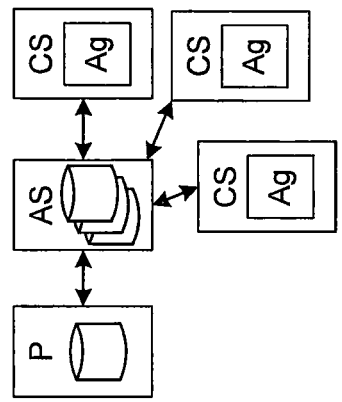

FIG. 7*d* illustrates an arrangement substantially the same as that of FIG. 7*c* and differing in that the policy information "P" is provided separate to the authorisation system 440 and in secure communication with, or securely accessible to, the authorisation system. Such an approach provides for decoupling of policy and authorisation systems. Security of the policy information is required to protect against unauthorised access and modification of policy information.

FIG. 7*e* illustrates an arrangement substantially the same as that of FIG. 7*d* and differing in that the policy information "P" is provided in secure communication directly to computer systems 400 such that agents 406 of computer systems 400 can securely communicate with a policy system to receive policy information to combine with authorisation and authentication information received from the authorisation system 440.

FIG. 7*f* illustrates an arrangement substantially the same as that of FIG. 7*b* and differing in that policy information "P" is further provided at each computer system 400.

Irrespective of the arrangement or configuration of embodiments of the present invention, the executable software agent 406 operates as a trusted component in the unrestricted mode 404 in order to provide secure and trusted access to the storage device. Further, communication and/or interoperation between the agent 406 and the authorisation system 440 and any policy information is via a secure and trusted means, such as a secure and trusted network, interface or connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for securely accessing a hardware storage device connected to a computer system, the hardware storage device having a unique hardware identifier and the computer system including a processor, the method comprising:

providing at least two modes of operation in the processor including an unrestricted mode of operation and a restricted mode of operation; wherein in the restricted mode of operation, the processor is subject to hardware enforced restrictions;

receiving, in a software agent executed by the processor of the computer system, a unique hardware identifier of the storage device;

authenticating the storage device using the unique hardware identifier, providing execution, by the agent, in the unrestricted mode of operation of the processor such that the agent is a trusted software component;

in response to the authentication, accessing, by the agent, a secure data key for encrypting and decrypting data on the storage device, the secure data key being identified with reference to the unique hardware identifier of the storage device;

encrypting and decrypting data on the storage device using the secure data key;

wherein the agent is securely communicatively connected to an authorisation system, the authorisation system securely storing the secure data key, and the agent receives the secure data key from the authorisation system;

wherein the data key is accessible, via the authorisation system, only to trusted agents executing in the unrestricted mode of the processor such that software executing in the restricted mode of operation of the processor stores and retrieves data on the storage device only via the agent using an interface of the agent through which all data storage and retrieval by the software executing in the restricted mode of the processor must pass; and wherein the agent is securely communicatively connected to the authorisation system which is remote from the computer system, the authorisation system securely storing the secure data key, and the agent receives the secure data key from the authorisation system which is remote from the computer system.

2. The method of claim 1 wherein the agent further receives a policy for the hardware storage device, the policy indicating operations that the computer system is permitted to perform with respect to the hardware storage device.

3. The method of claim 1 wherein the storage device includes first and second partitions for information storage, the first partition as a data volume for storage of user data and being encrypted using the data key, and the second partition as a metadata volume for storage of metadata and being encrypted using a metadata key being different to the data key.

4. The method of claim 3 wherein authentication of the storage device further includes:

communicating the unique hardware identifier to the authorisation system for authentication of the unique hardware identifier;

in response to receiving the metadata key from the authorisation system, the agent performing the steps of:
a) retrieving and decrypting metadata from the second partition of the storage device;
b) receiving a challenge request from the authorisation system to authenticate the metadata;
c) communicating a response to the challenge to the authorisation system, the response being based on at least part of the decrypted metadata; and
d) receiving an indication of whether the storage device is authenticated from the authorisation system.

5. The method of claim 2 wherein the permitted operations include a read operation.

6. The method of claim 2 wherein the permitted operations include a write operation.

7. The method of claim 2 wherein the permitted operations are restricted to a predetermined time window.

8. The method of claim 2 wherein the policy is received from the authorization system.

9. The method of claim 1 wherein the hardware storage device is an exchangeable storage device designed to be exchangeable between multiple computer systems.

10. The method of claim 1 wherein the hardware storage device is a USB flash drive.

11. The method of claim 1 wherein the agent is securely communicatively connected to the authorisation system which is remote from the computer system via a secure wireless connection.

12. A computer system for securely accessing a hardware storage device connected thereto, the hardware storage device having a unique hardware identifier and the computer system comprising:
a processor including at least two modes of operation including an unrestricted mode of operation and a restricted mode of operation; wherein, in the restricted mode of operation, the processor is subject to hardware enforced restrictions, and wherein, the processor is configured to execute, in an unrestricted mode of the processor, a software agent adapted to receive a unique hardware identifier of the storage device and to authenticate the storage device using the unique hardware identifier;
in response to the authentication, the agent accessing a secure data key for encrypting and decrypting data on the storage device, the secure data key being identified with reference to the unique hardware identifier of the storage device;
the computer system being configured to encrypt and decrypt data on the storage device using the secure data key;
wherein the agent is securely communicatively connected to an authorisation system, the authorisation system securely storing the secure data key, and the agent receives the secure data key from the authorisation system;
wherein the data key is accessible, via the authorisation system, only to trusted agents executing in the unrestricted mode of the processor such that software executing in the restricted mode of operation of the processor stores and retrieves data on the storage device only via the agent using an interface of the agent through which all data storage and retrieval by the software executing in the restricted mode of the processor must pass; and
wherein the agent is securely communicatively connected to the authorisation system which is remote from the computer system, the authorisation system securely storing the secure data key, and the agent receives the secure data key from the authorisation system which is remote from the computer system.

13. The computer system of claim 12 wherein the agent is further adapted to receive a policy for the hardware storage device, the policy indicating operations that the computer system is permitted to perform with respect to the hardware storage device.

14. The computer system of claim 12 wherein the storage device includes first and second partitions for information storage, the first partition as a data volume for storage of user data and being encrypted using the data key, and the second partition as a metadata volume for storage of metadata and being encrypted using a metadata key being different to the data key.

15. The computer system of claim 14 wherein the agent is further adapted to:
communicate the unique hardware identifier to the authorisation system for authentication of the unique hardware identifier;
in response to receiving the metadata key from the authorisation system:
a) retrieve and decrypting metadata from the second partition of the storage device;
b) receive a challenge request from the authorisation system to authenticate the metadata;
c) communicate a response to the challenge to the authorisation system, the response being based on at least part of the decrypted metadata; and
d) receive an indication of whether the storage device is authenticated from the authorisation system.

16. The computer system of claim 12 wherein the agent is securely communicatively connected to the authorisation system which is remote from the computer system via a secure wireless connection.

17. A non-transitory computer-readable storage medium storing a computer program element comprising a computer program code to, when loaded into a computer system and executed thereon, cause the computer to perform the following steps:
providing at least two modes of operation in a processor including an unrestricted mode of operation and a restricted mode of operation; wherein in the restricted mode of operation, the processor is subject to hardware enforced restrictions;
receiving, in a software agent executed by the processor of the computer system, a unique hardware identifier of a hardware storage device;
authenticating the storage device using the unique hardware identifier,
providing execution, by the agent, in the unrestricted mode of operation of the processor such that the agent is a trusted software component;
in response to the authentication, accessing, by the agent, a secure data key for encrypting and decrypting data on the storage device, the secure data key being identified with reference to the unique hardware identifier of the storage device;
encrypting and decrypting data on the storage device using the secure data key;
wherein the agent is securely communicatively connected to an authorisation system, the authorisation system securely storing the secure data key, and the agent receives the secure data key from the authorisation system;
wherein the data key is accessible, via the authorisation system, only to trusted agents executing in the unrestricted mode of the processor such that software executing in the restricted mode of operation of the processor stores and retrieves data on the storage device only via the agent using an interface of the agent through which all data storage and retrieval by the software executing in the restricted mode of the processor must pass; and wherein the agent is securely communicatively connected to the authorization system which is remote from the computer system, the authorization system securely storing the secure data key, and the agent receives the secure data key from the authorization system which is remote from the computer system.

* * * * *